US005676895A

United States Patent [19]
Toivola et al.

[11] Patent Number: 5,676,895
[45] Date of Patent: Oct. 14, 1997

[54] METHOD FOR PRODUCING A BUILDING MATERIAL FORM A MIXTURE OF UNSCREENED THERMOPLASTIC WASTE AND MINERAL

[76] Inventors: Matti Toivola, Kalastajakuja 1 D 18, FIN-02230 Espoo; Ali-Pekka Toivola, Vartiokyläntie 39 B 4, FIN-00950 Helsinki, both of Finland

[21] Appl. No.: 553,533

[22] PCT Filed: May 30, 1994

[86] PCT No.: PCT/FI94/00215

§ 371 Date: Apr. 1, 1996

§ 102(e) Date: Apr. 1, 1996

[87] PCT Pub. No.: WO94/27800

PCT Pub. Date: Dec. 8, 1994

[30] Foreign Application Priority Data

May 31, 1993 [FI] Finland ..................... 932482

[51] Int. Cl.[6] .................. B29C 35/02; B29C 43/02
[52] U.S. Cl. ............... 264/112; 264/122; 264/DIG. 69
[58] Field of Search ...................... 264/112, 122, 264/DIG. 69

[56] References Cited

U.S. PATENT DOCUMENTS

| 5,124,125 | 6/1992 | Brent | 422/21 |
| 5,401,452 | 3/1995 | Lubowitz | 264/112 |
| 5,439,625 | 8/1995 | Schmidt | 264/112 |
| 5,500,174 | 3/1996 | Scott | 264/112 |

FOREIGN PATENT DOCUMENTS

WO93/14154  7/1993  WIPO.

OTHER PUBLICATIONS

Derwent Abstract of NL-A-8200730.
Derwent Abstract of WO 93/14154.

*Primary Examiner*—Mary Lynn Theisen
*Attorney, Agent, or Firm*—Burns, Doane, Swecker & Mathis, L.L.P.

[57] ABSTRACT

The invention relates to a method for producing a building material from a mixture of unscreened thermoplastic waste and mineral, preferably mineral aggregate. The crushed and/or screened mineral and plastic waste are washed, whereafter the mineral is heated to a predetermined temperature, and a given amount of plastic granules or plastic flakes made from the unscreened thermoplastic waste is mixed with the heated mineral aggregate. In the dosing and/or scattering stage, heated fine-grained filler mineral aggregate is further added to the resulting mass. The mass is dosed or scattered on a coating material, and the building marterial is pressed by compression moulding or flat-pressing and/or calendering to final thickness into slabs, blocks, bricks or boards. Applications include for example insulation boards used in soil mechanics, paving slabs or bricks, concrete formwork boards or blocks, noise and sight barrier elements, fire-, sound- and moisture-proofing slabs.

13 Claims, No Drawings

METHOD FOR PRODUCING A BUILDING MATERIAL FORM A MIXTURE OF UNSCREENED THERMOPLASTIC WASTE AND MINERAL

The invention relates to a method for producing a building material from a mixture of unscreened thermoplastic waste and mineral, preferably mineral aggregate, in which method the crushed and/or screened mineral and plastic waste are washed, whereafter the mineral is heated to a predetermined temperature, and a given amount of plastic granules or plastic flakes made from the unscreened thermoplastic waste is mixed with the heated mineral, and the resulting mass is pressed into building elements.

In connection with this invention, unscreened thermoplastic waste means all types of plastics that melt when heated and solidify when cooled, can be remelted and thereby made usable. Thermoplastic waste is today recyclable if it is screened. However, this application presents a method in which unscreened thermoplastic waste can be used as secondary raw material. In connection with this invention, mineral aggregate means crushed aggregate or macadam made of natural stone, gravel, sand, or gypsum waste or other mineral or expanded clay as well as crushed brick or crushed concrete, which is municipal or industrial waste and which has been screened into given grain sizes.

A method of this kind is previously known for example in connection with producing road surfacing material, which is disclosed in the publications WO 90/00161 and FR 2 563 212, for example. In the known method, plastics are mixed with heated mineral aggregate, using predetermined additives and plasticizers, with the purpose of affecting the behaviour of the above mentioned mixture of plastics and mineral aggregate. The plastics are of predetermined grade and type, and thus this method does not utilize plastic waste.

The publication SE 450 572 also discloses a method for manufacturing a building material which consists of a mixture of mineral aggregate and cement and to which plastic granules have been added without melting them. Slabs and pipes, for example, are made from this mixture by casting.

The publication DE 3 837 430 also discloses a method in which products are manufactured from a mixture of mineral aggregate and acrylic plastic by casting or injection.

The plastic raw materials used in the above mentioned and known production methods are unused or equivalent new materials, and they are primarily intended to increase the demand for plastics and to expand various uses of plastics.

In addition to the above, the publications NL 8 200 730 and JP 72 044 542 disclose a method in which waste or recycled plastic is utilized by mixing the same with hot mineral aggregate and thus forming a mass suitable for use as a building material.

One of the major problems with the present thermoplastic waste reclaimed for secondary use is that only certain types of thermoplastic waste are reclaimed. A secondary raw material made from specific clean thermoplastic waste also replaces new thermoplastic raw material to a high extent. Secondary use of thermoplastic waste is restricted by important factors such as whether the reclaimed thermoplastic waste contains only one type of thermoplastic, whether it consists of reclaimed thermoplastic of uniform good quality, and what kind of products can be manufactured therefrom. If the above questions concerning thermoplastics cannot be answered satisfactorily or if it is not known what kind of products can be manufactured from the reclaimed raw material, the reclaimed thermoplastic is plastic waste unsuitable for secondary use by the plastics industry, and as such it today ends up loading the capacity of dumps. There is no secondary use for unscreened thermoplastic waste, because the reclaimed raw material to be used contains such mutually incompatible types of plastics as cause problems in manufacturing processes in the plastics industry. Problems occurring in the manufacturing process include gassing and the relative effect of different types of plastics having different viscosities at the same temperature. One of the most difficult problems with the secondary use of unscreened, reclaimed thermoplastic waste is to combine thermoplastics of different grades and types and to manufacture industrially feasible end products from them.

Thus the very important object of the invention is to solve the problem with the use of unscreened, reclaimed thermoplastic waste by producing building materials from reclaimed thermoplastic waste in an environmentally friendly way. In order to realize this, the method according to the invention is characterized in that the mineral and the plastic raw material are: heated in a humid, water-containing environment in which The plastic raw material is plasticized and melted without adding any specific chemical solvents or plasticizers, whereafter a filler is added to the mass in order to compact the building material to be produced. Preferably so that plastic granules or plastic flakes are made from the unscreened thermoplastic waste before mixing it with minerals, whereby the process becomes controlled. In addition, the humid, water-containing environment is preferably provided by the water remaining in the mineral or in the thermoplastic waste after it has been washed with water. Thus, the raw materials need not dry or be dried separately, which would slow down the process. Other preferred embodiments of the invention are disclosed herein.

A significant advantage of the invention is the fact that the method can eliminate the environmental problem associated with the use of unscreened thermoplastic waste by manufacturing, by a simple production method, a building material from plastic secondary raw materials which are at the end of their life cycle. The relative quality characteristics and quantities of the secondary raw materials to be used do not need to be known in advance. A positive environmental effect is achieved with the method according to the invention in two ways. Firstly, it reduces the load on dumps, and secondly, using products manufactured by the method of he invention makes it possible to prevent disturbing influences and harmful effects on the environment. For example, runoff from dumps into groundwater can be prevented by insulating them with building slabs according to this invention. Due to the water-containing environment used in the method, the plastic can be plasticized quickly and uniformly without using solvents or plasticizers, which are harmful to the environment. The humidity also protects the plastic raw material from burning.

The mineral used in the invention has two effects. Firstly, it is a necessary medium which, when heated, alters the viscosity of unscreened thermoplastic and enables using in admixture certain types of plastics which otherwise cannot be used in manufacturing processes in the plastics industry, in which impurities or incorrect materials can spoil an entire production batch. Secondly, mineral is the basic material for the building material in which the heated mineral melts or plasticizes the thermoplastic, which serves as a binder for the mineral. The compactness of the building material is increased by using a filler, which is preferably a fine-grained mineral aggregate, gypsum waste other mineral, such as talc, which is added preferably in heated state to the mineral-thermoplastic mixture. Because of its poor conductivity, gypsum cannot be used as the main mineral. It is only suitable as a filler, in which case it must not account for more than approximately 15% of the dry weight of the mineral. The properties, purpose of use and appearance of the building material are varied by means of different coatings, such as metal sheets, wire meshes, aluminium foils, wood, paper, cardboard, stone, ceramic tiles or plastics. The building material can also be reinforced by using various profiles or meshes. Various kinds of sandwich structures may also be manufactured from it.

In the following the method of the invention for producing a building material will be described in detail.

In the method according to the invention, the types of thermoplastics to be used may contain a certain amount of impurities, such as cardboard, paper, aluminium, metal or comminuted thermosetting plastic waste, as is often the case with plastic waste. The unscreened thermoplastic waste is washed and made into plastic granulate and/or plastic chips. If the final product is desired to have given properties characteristics of a certain type of plastic, the plastic raw material may be sorted according to specific gravity. The mineral used in the method is preferably mineral aggregate, from which grains smaller than 3 mm are separated in one screening in one fraction, and grains larger than that are screened according to the thickness of the building material to be produced so that the largest grain size is approximately one half of the thickness of the final product. The grain size of the mineral aggregate must not be too large, because then it is not suitable for the use according to the invention. Mineral with a large grain size requires a lot of energy to become heated, and in spite of that It is not certain that the entire volume of the mineral has become uniformly heated. The plastic raw material will not adhere to mineral heated only on the surface. On the other hand, if the surface temperature rises too much, the plastic will burn, whereby a large amount of combustion gases (and smoke) is released from the process. On the basis of tests it has been found that the mineral aggregate must be smaller than 20 mm. The most preferred grain size is 3 to 4 mm. The small grain size helps to achieve a shorter pass-through time in the manufacturing process, which is recommended. On the basis of tests it has also been found that the smaller the difference between the grain sizes of the plastic raw material granulate and mineral aggregate is, the more even, more homogeneous, the final result will be. Thus it is advantageous to choose as similar grain sizes as possible for both the mineral aggregate and the plastic granulate. The screened mineral aggregate is washed clean from dust, which improves the adherence of the thermoplastic to the mineral aggregate.

The mineral aggregate, which has a grain diameter of >3 mm, is heated to a temperature of about 160° to 220° C. After that, thermoplastic is added and mixed with the mineral aggregate to the extent that the grains of the mineral aggregate can receive the thermoplastic all over their surface area. The amount of thermoplastic to be added is 10 to 40% of the dry. weight of the mineral aggregate depending on the varying grain size of the mineral aggregate. The mixing process also includes a certain amount of humidity, either coming from the washed material or separately added to the process. The humidity prevents the plastic raw material from burning and facilitates its plasticizing. In the dosing and/or scattering stage, approximately 10% of mineral aggregate, gypsum waste or other mineral with a grain size of 3 mm or smaller, heated to a temperature of 150° C., is further added to the mixture of thermoplastic and mineral aggregate to improve compactness. The unmixed mineral is screened away from the thermoplastic-mineral aggregate-filler mixture, and the remaining mixture is dosed or scattered on a coating material and pressed by compression moulding or flat-pressing and/or calendering to final thickness. The compression is carried out by a method in which the cooling water circulating in the press plate prevents the mixture to be pressed from adhering to the press plates due to condensation and also lowers the surface temperature of the building material. In the compression, the mixture has a temperature of about 160° C., and the pressure to be used is approx. 0.7 to 15 Mpa, preferably 4 to 9 Mpa, and the compression time is approx. 1 second per millimetre of thickness. The mineral aggregate-thermoplastic-filler mixture is scattered or dosed on the coating material, which improves the properties and usability of the building material. The last stage is the after-cooling of the building material.

A slab element can also be manufactured so that the heated mineral aggregate is scattered on the surface of the press, and the fine-grained plastic granulate mixed with the filler is scattered on the mineral aggregate. After that, while the press is being pressed, heated water is injected through the holes in the press surfaces into the mineral aggregate-plastic granulate mixture. The water facilitates, due to the vaporization caused by the hot mineral aggregate, the plasticizing of the plastic granulate and thus speeds up its adherence to the mineral aggregate. The water injected into the mixture also prevents the mixture from adhering to the plate surfaces of the press. Various types of coatings can be applied to the slabs afterwards using known methods, such as glueing or plasticizing the mounting surface by means of infrared heating.

The following is a working example of the invention, by means of which it is possible to manufacture an environmental slab, a so called yard slab, 500×500 ×50 mm in size. In the mineral aggregate to be used, the largest grain size is approximately one half of the thickness of the final product, that is, about 25 mm. In this case the grain size of the mineral aggregate is >3 mm or the fractions >3 to 25 mm. The mineral aggregate is heated to about 200° C. Thermoplastic is then added to the heated mineral aggregate, the approximate amount of thermoplastic having been determined on the basis of a product test, for example 13%, and it is mixed with the mineral aggregate. After this, a filler mineral aggregate is added to the mixture of mineral aggregate and thermoplastic. In this case the filler is sand, which has a grain size of 3 mm or smaller and which has been heated to a temperature of about 150° C. The addition is performed uniformly and simultaneously with dosing into the slab mould. One layer of decorative macadam has been laid on the bottom of the mould and heated to approximately 120° C., and a coloured plastic film, which melts at approx. 100° C., is laid on top of the macadam as background colour, and the mineral aggregate-thermoplastic-filler mixture is applied on a plastic film. The thickness of the mixture in the mould is 75 to 100 mm, i.e. 1.5 to 2 times the final thickness. After this, the mixture is pressed to a thickness of 50 mm using a pressure of approximately 1.1 Mpa for 50 seconds. The slab is removed from the mould when it is certain that no change of form will occur in the slab after that. The last stage is the after-cooling of The slab and quality classification by weighing, which enables determination of the compactness and density of the final product and thereby the strength of the slab.

Slabs manufactured according to the invention can be installed permanently or temporarily. As an example of temporarily installed slabs can be mentioned slabs intended for temporary surfacing of butts and embankment fills to prevent the earth material from moving or collapsing because of weather conditions. In permanent installation, it is possible to build noise barriers and fences in such a way that the slabs are piled upright on their edges between U-profile frames made of metal.

A special property of building slabs manufactured by the method according to the invention is good moisture-proofness, which for example a gypsum board does not have. Typical applications of the slabs and boards are sites which require high strength and moisture-proofness.

The invention is naturally not limited to the above working example, but it can be varied in many ways without departing from the scope of the inventive concept defined in the attached claims.

We claim:

1. A method for producing a building material from a mixture of unscreened thermoplastic waste and mineral, in which method crushed and/or screened mineral and plastic waste are washed, whereafter the mineral is heated to a predetermined temperature, and a given amount of plastic granules or plastic flakes made from unscreened thermoplastic waste is mixed with the heated mineral, and the resulting mass is pressed into building elements, wherein the mineral and the plastic raw material are heated in a humid, water-containing environment in which the plastic raw material is plasticized and melted without adding any specific chemical solvents or plasticizers, whereafter a filler is added to the mass in order to compact the building material to be produced.

2. A method according to claim 1, wherein plastic granules or plastic flakes are made from the unscreened thermoplastic waste before mixing it with minerals.

3. A method according to claim 2, wherein the humid, water-containing environment is provided by water remaining in the mineral or thermoplastic waste after washing with water.

4. A method according to claim 2, wherein the thermoplastic waste used contains a certain amount of impurities.

5. A method according to claim 2, wherein the mineral used is mineral aggregate with a grain size smaller than 20 mm and the grain size of the thermoplastic waste is substantially the same.

6. A method according to claim 1, wherein the filler used is fine-grained mineral aggregate, gypsum waste, talc or other mineral.

7. A method according to claim 6, wherein the filler is added in heated state to the mineral-thermoplastic mixture, said filler being heated to a temperature which is at the most 70° C. lower than that of the mineral-thermoplastic mixture.

8. A method according to claim 1, wherein the mineral which has not become mixed with the thermoplastic is screened away from the mineral-thermoplastic-filler mixture.

9. A method according to claim 1, wherein the mineral-thermoplastic-filler mixture is dosed or scattered on a coating material before compression, said coating material being metal sheets, wire meshes, aluminum foils, wood, paper, cardboard, stones, ceramic tiles or plastics.

10. A method according to claim 1, wherein the mineral aggregate is heated to a temperature of 160° to 220° C., the compression pressure is 0.7 to 15 Mpa and the compression time is approximately 1 second per 1 millimeter of thickness of the material to be pressed.

11. The method according to claim 1, wherein the mineral comprises a mineral aggregate.

12. The method according to claim 4, wherein the impurities are cardboard, paper, aluminum, metal or comminuted thermosetting plastic waste.

13. The method according to claim 5, wherein the mineral used is mineral aggregate with a grain size of 3 to 4 mm, and the grain size of the thermoplastic waste is substantially the same.

* * * * *